(12) United States Patent
Brown et al.

(10) Patent No.: US 6,973,320 B2
(45) Date of Patent: Dec. 6, 2005

(54) METHOD AND APPARATUS FOR LOCATING A REMOTE UNIT WITHIN A COMMUNICATION SYSTEM

(75) Inventors: Larry Michael Brown, Lake in the Hills, IL (US); Norman Joseph Zerfas, Roselle, IL (US); Marty Frank Miller, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 566 days.

(21) Appl. No.: 10/134,282

(22) Filed: Apr. 29, 2002

(65) Prior Publication Data

US 2003/0203738 A1 Oct. 30, 2003

(51) Int. Cl.[7] ............................................. H04Q 7/20
(52) U.S. Cl. .................. 455/456.1; 455/456.2; 455/456.3; 455/456.6; 455/404.1; 455/404.2; 455/422.1; 455/440; 340/988; 340/996
(58) Field of Search .................. 455/456.1–456.6, 455/502, 403, 423, 457, 440, 441, 422, 404.1–404.2, 455/422.1; 340/988–996

(56) References Cited

U.S. PATENT DOCUMENTS

| | | | |
|---|---|---|---|
| 5,228,076 A | * | 7/1993 | Hopner et al. ............ 379/93.17 |
| 5,724,243 A | * | 3/1998 | Westerlage et al. ...... 455/456.5 |
| 5,952,969 A | | 9/1999 | Hagerman et al. |
| 6,002,932 A | | 12/1999 | Kingdon et al. |
| 6,031,490 A | * | 2/2000 | Forssen et al. ............. 342/457 |
| 6,047,183 A | * | 4/2000 | Kingdon et al. ............ 455/440 |
| 6,097,959 A | | 8/2000 | Yost et al. |
| 6,138,003 A | * | 10/2000 | Kingdon et al. ............ 455/410 |
| 6,151,498 A | * | 11/2000 | Roel-Ng et al. ............ 455/433 |
| 6,185,428 B1 | * | 2/2001 | Kingdon et al. ......... 455/456.2 |
| 6,230,018 B1 | * | 5/2001 | Watters et al. ........... 455/456.3 |
| 6,405,047 B1 | * | 6/2002 | Moon ....................... 455/456.1 |
| 6,473,619 B1 | * | 10/2002 | Kong et al. .............. 455/456.1 |
| 6,522,887 B2 | * | 2/2003 | Larsson et al. .......... 455/456.5 |
| 6,526,283 B1 | * | 2/2003 | Jang ........................ 455/456.5 |
| 6,694,142 B1 | * | 2/2004 | Kuwahara et al. ....... 455/456.1 |
| 6,741,863 B1 | * | 5/2004 | Chiang et al. ........... 455/456.1 |
| 6,804,524 B1 | * | 10/2004 | Vandermeijden ......... 455/456.1 |
| 6,810,321 B1 | * | 10/2004 | Cook ......................... 701/117 |
| 6,898,569 B1 | * | 5/2005 | Bansal et al. .................. 705/9 |
| 2003/0119524 A1 | * | 6/2003 | Carlsson ..................... 455/456 |
| 2003/0190921 A1 | * | 10/2003 | Stewart ................... 455/456.3 |
| 2003/0203738 A1 | * | 10/2003 | Brown et al. ............ 455/456.1 |

* cited by examiner

*Primary Examiner*—Sonny Trinh
*Assistant Examiner*—Khai Nguyen

(57) ABSTRACT

Timing Advance information is obtained from base stations (103–105), and is utilized by a remote unit (113) to approximate the Time of Arrival (TOA) of the signals from each base station. The remote unit (113) accesses a single base station to determine its timing advance. In order to increase accuracy, the remote unit (113) then repeats the process, but during the next iteration, the transmission timing is advanced or delayed by a fraction of a bit (e.g. ¼ bit). The base station responds with a new timing advance value. This process is repeated until it is determined how many fractions of bit increments the remote unit (113) is away from a known timing advance boundary of the base station. Once known, this information is utilized to determine the location of the remote unit (113).

10 Claims, 3 Drawing Sheets

METHOD AND APPARATUS FOR LOCATING A REMOTE UNIT WITHIN A COMMUNICATION SYSTEM

FIELD OF THE INVENTION

The present invention relates generally to remote, or mobile unit location and in particular, to a method and apparatus for locating a remote unit within a communication system.

BACKGROUND OF THE INVENTION

It is well known that a remote unit's location within a wireless communication system may be determined using a trilateration method. According to such a method, distances between remote unit and multiple base stations are calculated based on the measurement of a time delay of a signal traveling between the remote unit and each base station. Such a prior-art method for calculating a remote unit's location is described in U.S. Pat. No. 5,508,708 "METHOD AND APPARATUS FOR LOCATION FINDING IN A CDMA SYSTEM" by Ghosh et al. and assigned to the assignee of the present invention.

Additionally, U.S. Pat. No. 6,097,959 by Yost et al., describes the use of a "timing advance" metric to determine time-of-arrival (TOA) data in order to calculate a remote unit's location. Because timing advance values are expressed in bit periods, with each bit period corresponding to approximately 550 meters, the accuracy of using timing advance values for location can lead to large errors in location estimates. For example, in the GSM system, if the timing advance value equals 1, remote unit could be anywhere in an annular region from a radius of 825 meters to a radius of 1375 meters. It is well know that any errors in the timing advance information are inherited by the trilateration algorithm used for locating remote unit. Therefore, a need exists for a method and apparatus for locating a remote unit that minimizes the errors in timing advance information so that remote unit can be more-accurately located.

DETAILED DESCRIPTION OF THE DRAWINGS

To address the above-mentioned need, timing advance information is obtained from base stations, and is utilized by a remote unit to approximate the Time of Arrival (TOA) of the signals from each base station. The remote unit accesses a single base station to determine its timing advance (e.g. via a Random Access Channel for GSM). In order to increase accuracy the remote unit then repeats the process, but during the next iteration, the transmission timing is advanced or delayed by a fraction of a bit (e.g. ¼ bit). The base station responds with a new timing advance value. This process is repeated until it is determined how many fractions of bit increments the remote unit is away from a known timing advance boundary of the base station. Once known, this information is utilized to determine the location of the remote unit.

The present invention encompasses a method for locating a remote unit within a communication system. The method comprises the steps of transmitting a first message to a base station, determining a timing advance based on the first message, and advancing or retarding transmission circuitry. A second message is then transmitted to the base station and a second timing advance is determined based on the second message. Finally, a location is determined based on the first and the second timing advance.

The present invention additionally encompasses a method for determining a distance (C) from a base station. The method comprises the steps of determining a distance to a timing-advance boundary ($D_{TA}$), determining a distance attributed to advancing or retarding transmission circuitry ($D_{ADV}$), determining a number of iterations (N) of advancing or retarding transmission that causes a change in a timing advance, and determining C based on $D_{TA}$, $D_{ADV}$, and N.

The present invention additionally encompasses an apparatus for determining location. The apparatus comprises a transceiver outputting a first message and a second message, wherein the second message is advanced or retarded in time by a fraction of a timing-advance bit. The apparatus additionally comprises logic circuitry determining a first and a second timing advance value based on the first and the second message and determining a distance from a first base station based on the first and the second timing advance values.

Figure 1:
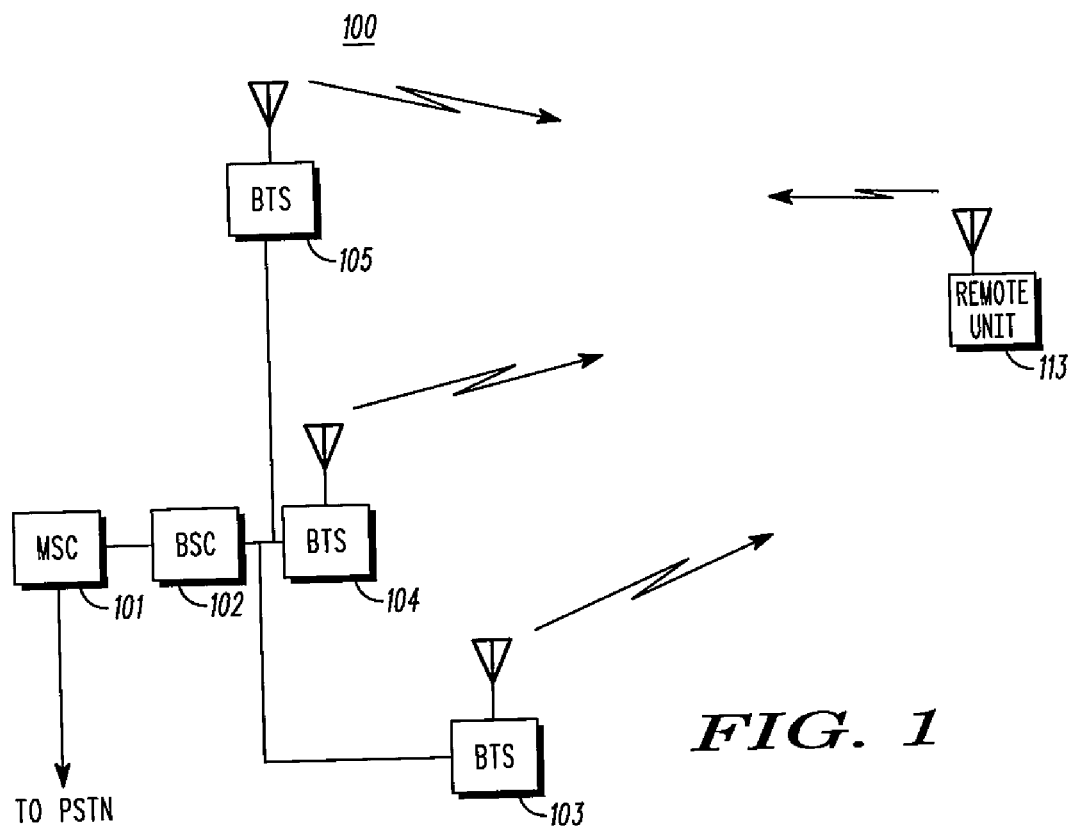
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. Wireless communication system 100 is preferably a cellular communication system that utilizes the Global System for Mobile Communications (GSM) protocol, however, in alternate embodiments of the present invention communication system 100 may utilize any digital system protocol such as, but not limited to, TDMA protocols such as the Motorola Inc. iDEN system protocol or other TDMA based communication systems. Communication system 100 comprises remote unit 113, Base Stations 103–105, Centralized Base Station Controller (BSC) 102, and Mobile Switching Center (MSC) 101. As one of ordinary skill in the art recognizes, the GSM system uses a Time Division Multiple Access (TDMA) protocol to handle over-the-air communication. GSM divides each frequency (carrier) into eight time slots (physical channels). However, with other TDMA systems, more or less time slots can be used. For example, in the Motorola iDEN system, each frequency is divided into 3 or 6 voice channel time slots.

GSM systems includes a timing advance value, which corresponds to the amount of time in advance that a remote unit must send a message in order for a Base Transceiver Station 103–105 to receive the message in the time slot allocated to that remote unit 113. When the remote unit is idle (not communicating with the base station) timing advance information is reported to the remote unit 113 after an access is made to the Base Transceiver Station 103–105. When the remote unit has established a dedicated channel, with the base station, timing advance information is reported 4 to 5 times every second by Base Transceiver Station 103–105 to the remote unit 113 and comprises a number ranging from 0–63, with each number corresponding to approximately a 550 meter radial distance from a receiving Base Transceiver Station (BTS) 103–105.

In the preferred embodiment of the present invention the Timing Advance information obtained from base stations 103–105 is utilized by remote unit 113 to approximate Time of Arrival (TOA) of the signals from each base station. Each timing advance value corresponds to a circular contour around each receiving base station 103–105 representing the locus of all possible locations of remote unit 113. The actual location of remote unit 113 lies at the best intersection of all the respective circular contours. As discussed above, because timing advance values are expressed in bit periods, with each bit period corresponding to approximately 550 meters, the accuracy of using timing advance values for location can lead to large errors in location estimates. In order to solve this problem, remote unit 113, when in idle mode, accesses a single base station on a Random Access Channel (RACH) to determine its timing advance. The remote unit then repeats the process, but during the next iteration, the RACH timing is advanced or delayed by a fraction of a bit (e.g. ¼ bit). The base station 103–105 responds with a new timing advance value. This process is repeated until it is determined how many fractions of bit increments remote unit 113 is away from the theoretical timing advance. An example of this process is illustrated in FIG. 2.

Figure 2:
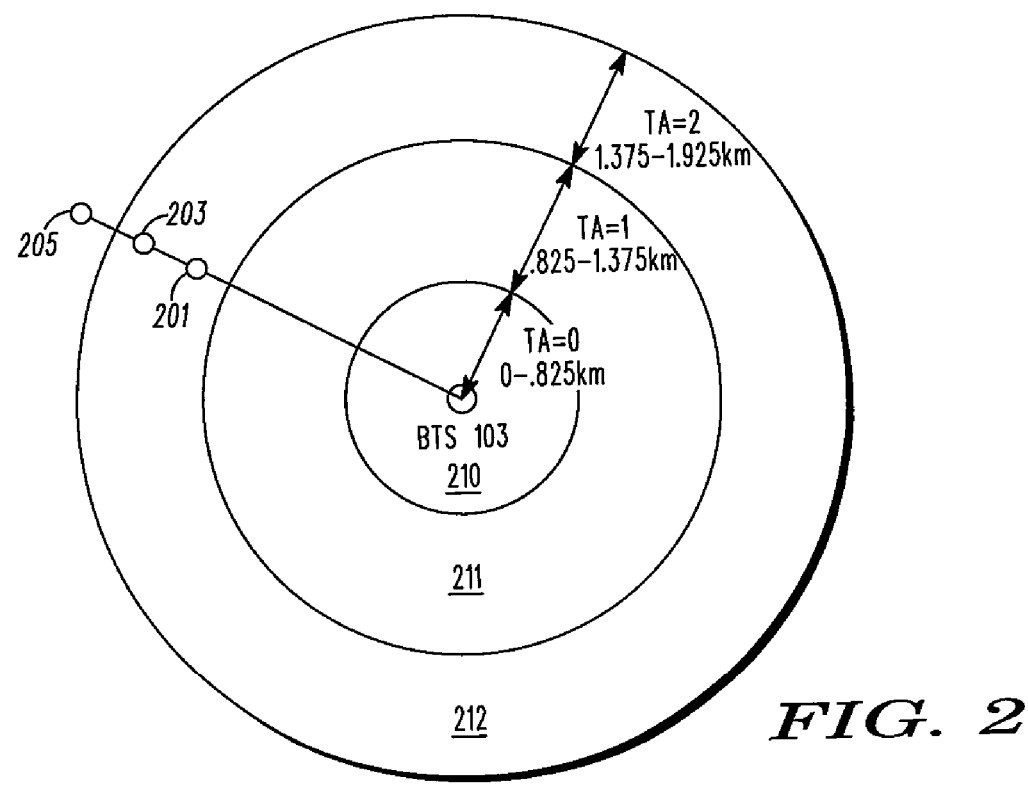
FIG. 2 illustrates the use of timing advance to locate a remote unit in accordance with the preferred embodiment of the present invention.

In FIG. 2, BTS 103 is shown with three timing-advance areas 210–212. The actual position of remote unit 113 is shown as point 201. Remote unit 113 transmits data on an over-the-air channel and determines that timing advance is equal to 2 with respect to BTS 103. This information alone is enough to tell remote unit 113 that it is located somewhere in area 212. Remote unit 113 repeats the process, but delays the RACH transmission by a ¼ bit and determines the new timing advance (point 203), which in this example is still equal to 2. Because each ¼ bit delay corresponds to ¼*0.55 km=0.1375 km, and because timing advance is again equal to 2, remote unit 113 determines that it is at least 0.1375 km into area 212.

The process is again repeated only on the $2^{nd}$ ¼ bit delay iteration (point 205) remote unit 113 determines the timing advance has now changed to 3. The remote unit 113 can now calculate that it resides between ¼ to ½ bit of time advancement from the timing advance boundary (location where the timing advance changed from 2 to 3). The distance to the theoretical ring at timing advance equal to 2 is 1.925 km out from the actual BTS 103 location. With this information it can now be calculated that remote unit 113 resides between ((1.925 km−(½ bit*0.55 km))=1.650 km) and ((1.925 km−(¼ bit*0.55 km))= 1.788 km) from BTS 103. Knowing that remote unit 113 is somewhere between the two rings, the center point is chosen. This implies remote unit 113 is (1.650 km+1.788 km)/2=1.719 km from base station 103, with a distance error of up to 0.138 km (138 meters). The above procedure is repeated for at least base stations 104 and 105, and a location is determined.

A general determination of a remote unit's location is calculated below:

If:

$D_{TA}$=the actual distance to the timing advance boundary
$D_{ADV}$=the actual distance attributed to advancing/retarding the time advance of the data burst;
N=the number of iterations in timing advance to cause a change in timing advance; and
C=the remote unit's actual distance from the base station; then Assuming: $D_{TA}=C+(N-1)D_{ADV}+½[(C+ND_{ADV})-(C+(N-1)D_{ADV})]$, it can be shown that:

$$C=D_{TA}-(N-½)D_{ADV}$$

Thus, with reference to FIG. 2, point 201 lies a distance C from BTS 103, and point 203 lies a distance of C+(N−1)$D_{ADV}$ from BTS 103, and point 205 lies a distance of C+N$D_{ADV}$ from BTS 103. Assuming that $D_{TA}$ lies half way between points 203 and 205, then:

$$D_{TA}=C+(N-1)D_{ADV}+½[(C+ND_{ADV})-(C+(N-1)D_{ADV})]$$

From this it can be shown that:

$$C=D_{TA}-(N-½)D_{ADV}$$

To minimize the number of iterations necessary, many different techniques could be utilized to determine the timing advance boundary. For example, a higher probability of accurately locating remote unit 113 can be obtained by accessing more BTSs or the utilization of statistical averaging of timing advance values. Additionally, finer timer advancements or delays (e.g. ¹⁄₁₆ bit) would yield even greater accuracy with a distance error less than or equal to (0.550 km*¹⁄₁₆)<= 0.034 km<=34 m.

As is evident, the above technique utilizes timing advance to more accurately predict remote unit location. More particularly, where prior-art methods resulted in a remote unit determining its distance from a base station to within 550 meters, the above technique reduces this value to 138 meters, and can be used to further reduce the error by using smaller advancements or delays.

Figure 3:
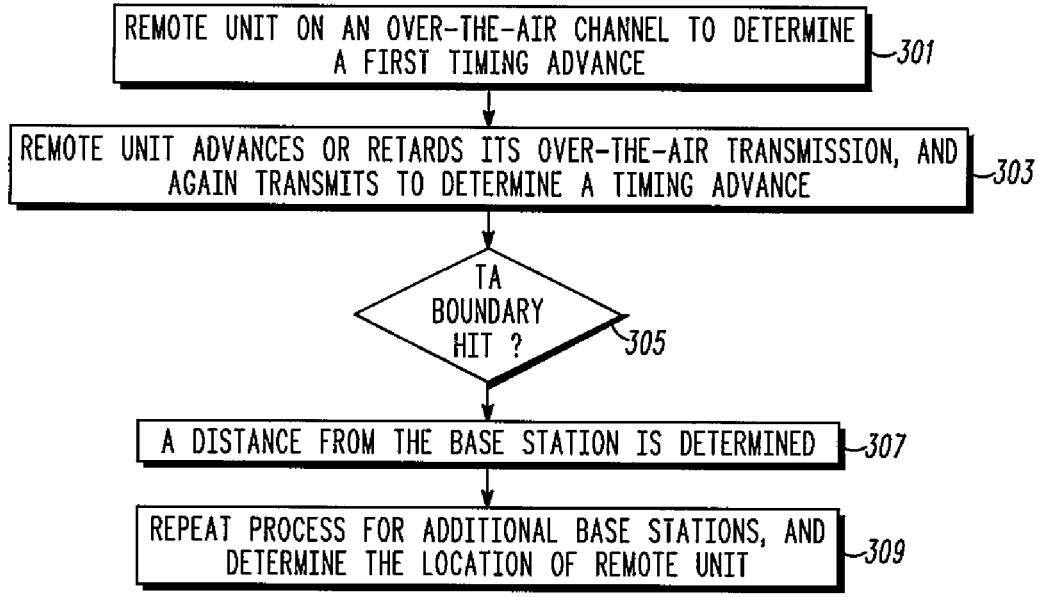
FIG. 3 is a flow chart showing operation of the communication system of FIG. 1 in accordance with the preferred embodiment of the present invention.

FIG. 3 is a flow chart showing operation of the communication system of FIG. 1 in accordance with the preferred embodiment of the present invention. The logic flow begins at step 301 where remote unit 113 transmits on an over-the-air channel to determine a first timing advance. The logic flow then continues to step 303 where remote unit 113 advances or retards its over-the-air transmission, and again determines a timing advance. At step 305, remote unit 113 determines if a timing advance boundary has been hit. In particular, it is determined if advancing, or retarding the over-the-air transmission has caused the timing advance to advance or retard. If at step 305 it is determined that a timing advance boundary has been hit, the logic flow continues to step 307, otherwise the logic flow returns to step 303. At step 307 a distance from the base station is determined based on the amount of timing advances needed to hit the timing advance boundary. Once determined the above procedure is repeated for additional base stations, and the location of remote unit 113 is determined using standard TOA techniques (step 309). In particular, when the distances $x_1$ and $x_2$ between a remote unit and a pair of fixed base stations are known, the position of the remote unit may be computed by determining the point of intersection of two circles with radii $x_1$ and $x_2$, each centered at one of the fixed base stations. In actuality, at least a third base station is typically needed to unambiguously locate each remote unit at the unique point of intersection of the three circles.

Figure 4:
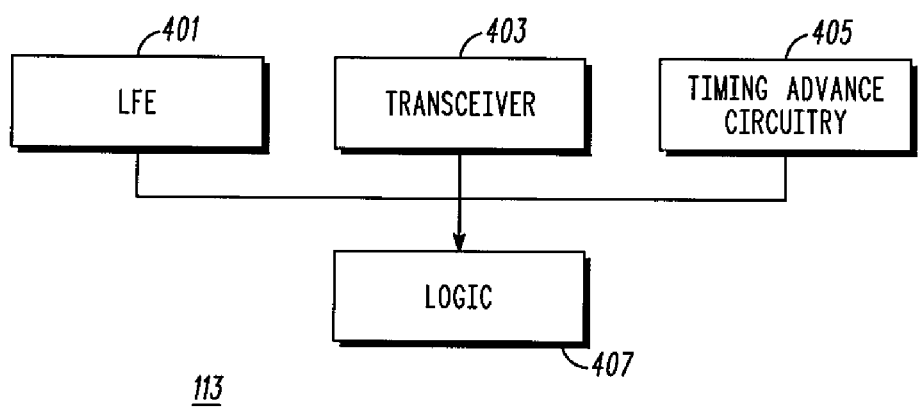
FIG. 4 is a block diagram of a remote unit in accordance with the preferred embodiment of the present invention.
Figure 5:
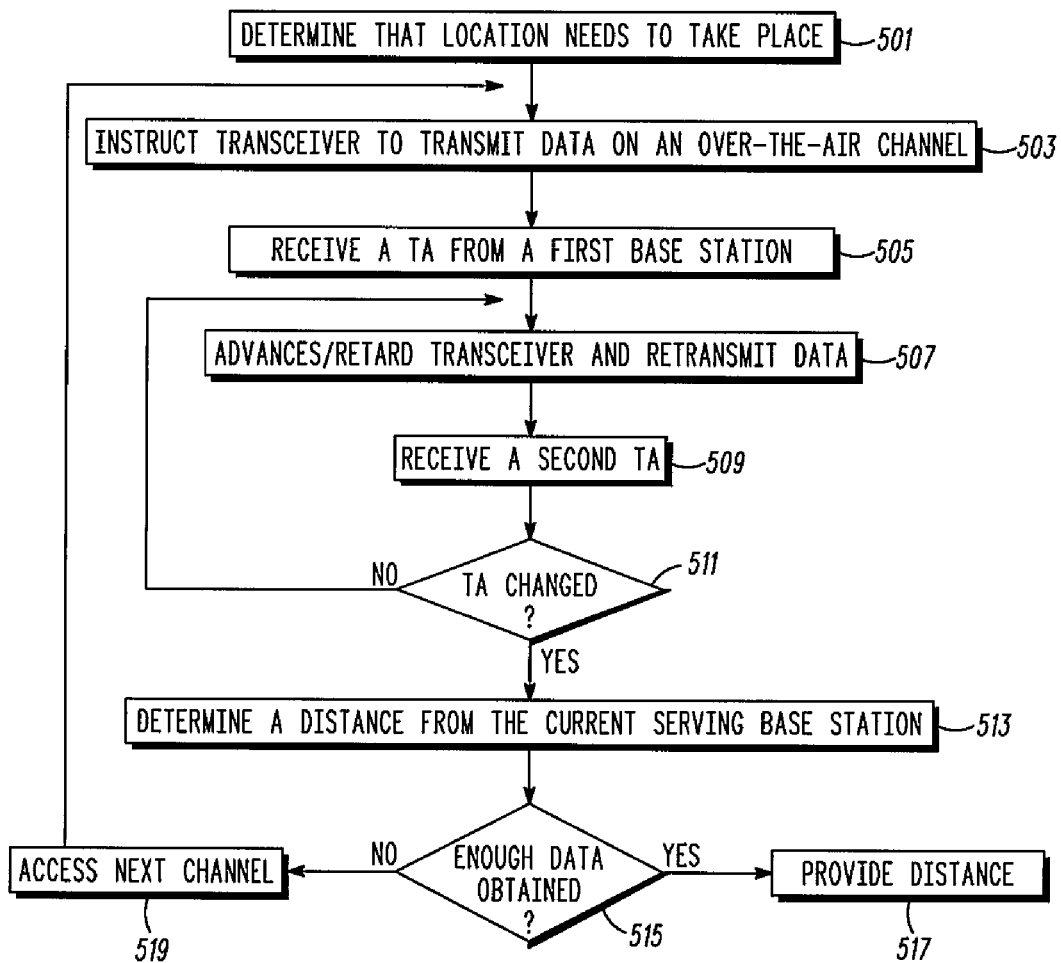
FIG. 5 is a flow chart showing operation of the remote unit of FIG. 2 in accordance with the preferred embodiment of the present invention.

FIG. 4 is a block diagram of a remote unit in accordance with the preferred embodiment of the present invention. As shown, remote unit 113 comprises location finding equipment (LFE) 401, transceiver 403, timing advance circuitry 405, and logic circuitry 407. Operation of remote unit 113 in accordance with the preferred embodiment of the present invention occurs as shown in FIG. 5. The logic flow begins at step 501 where logic unit 407 determines that location needs to take place. Once it has been determined that location needs to take place, the logic flow continues to step 503 where logic circuitry 407 instructs transceiver 403 to transmit data on an over-the-air channel. In the preferred embodiment of the present invention the channel comprises a RACH channel, however, one of ordinary skill in the art will recognize that any over-the-air channel may be utilized for transmission. Transceiver 403 then receives a first timing advance from a first base station and provides this to logic circuitry 407 (step 505). In particular, base stations 103–105 respond with an Immediate Assignment message (defined in GSM 4.08) to provide the timing advance value to the remote unit 113. Logic circuitry then advances/retards transceiver utilizing timing advance circuitry 405, and retransmits the RACH burst (step 507), again receiving a second timing advance in response (step 509). At step 511 it is determined if the timing advance has changed. In particular, at step 511 it is determined by logic circuitry 407, if the first and the currently received timing advance are equal, and if so, the logic flow returns to step 507, otherwise the logic flow continues to step 513 where logic circuitry determines a distance from the current serving base station. As discussed above, logic circuitry 407 utilizes the fact that the timing advance has changed to determine a more accurate determination of the distance to the serving base station. At step 515, logic circuitry 407 determines if enough data has been obtained for an accurate location, and if so, the logic flow continues to step 517 where the current distance is provided to location finding equipment 401 for location determination. If, however, it is determined that more data needs to be acquired to determine the remote unit's location, then the logic flow continues to step 519 where remote unit 113 is handed off to another serving base station, and the logic flow returns to step 503.

While the invention has been particularly shown and described with reference to a particular embodiment, it will be understood by those skilled in the art that various changes in form and details may be made therein without departing from the spirit and scope of the invention. For example, although in the preferred embodiment of the present invention remote unit 113 performed location estimates, one of ordinary skill in the art will recognize that the location finding equipment may be located anywhere internal or external to remote unit 113. For example, a serving base station may perform location estimates as described above. In this scenario, the base station will instruct the remote unit to advance/retard its transmission by a certain amount, and then determine the timing advance. Location will take place utilizing TOA techniques as described above. It is intended that such changes come within the scope of the following claims.

What is claimed is:

1. A method for locating a remote unit within a communication system, the method comprising the steps of:
    transmitting a first message to a base station;
    determining a timing advance based on the first message;
    advancing or retarding transmission circuitry;
    transmitting a second message to the base station;
    determining a second timing advance based on the second message;
    determining a location based on advancing or retarding transmission circuitry by a fraction of a timing-advance bit;
    wherein the step of determining a distance from the base station comprises the steps of determining a value for C, wherein C is approximately equal to:

$D_{TA} - (N - \frac{1}{2}) D_{ADV}$ where, $D_{TA}$=a distance to a timing-advance boundary;
    $D_{ADV}$=distance attributed to advancing/retarding the transmission circuitry: and
    N=a number of iterations in timing advance that causes a change in the timing advance.

2. The method of claim 1 wherein the step of transmitting the first message comprises the step of transmitting the first message on a Random Access Channel.

3. The method of claim 1 further comprising the steps of:
    transmitting a third message to a second base station;
    determining a third timing advance based on the third message;
    advancing or retarding transmission circuitry;
    transmitting a fourth message to the second base station;
    determining a fourth timing advance based on the fourth message; and
    determining the location based on the first, the second, the third, and the fourth timing advance.

4. The method of claim 3 wherein the step of determining the location comprises the step of determining the location based on a Time of Arrival (TOA) technique.

5. The method of claim 1 wherein the step of determining the location comprises the step of determining a distance from the base station.

6. A method for determining a distance (C) from a base station, the method comprising the steps of:
    determining a distance to a timing-advance boundary ($D_{TA}$);
    determining a distance attributed to advancing or retarding transmission circuitry ($D_{ADV}$);
    determining a number of iterations (N) of advancing or retarding transmission that causes a change in a timing advance; and
    determining C based on $D_{TA}$, $D_{ADV}$, and N.

7. The method of claim 6 wherein the step of determining the distance attributed to advancing or retarding transmission circuitry comprises the step of determining the distance attributed to advancing or retarding transmission circuit by a fraction of a timing-advance bit.

8. An apparatus for determining location, the apparatus comprising:
    a transceiver outputting a first message and a second message, wherein the second message is advanced or retarded in time by a fraction of a timing-advance bit; and
    logic circuitry determining a first and a second timing advance value based on the first and the second message and determining a distance from a first base station based on the first and the second timing advance values; wherein the distance from the firm base station is calculated based on the formula:

$D_{TA} - (N - \frac{1}{2}) D_{ADV}$ where, $D_{TA}$=a distance to a timing-advance boundary
    $D_{ADV}$=a distance attributed to advancing/retarding the transmission circuitry; and
    N=a number of iterations in timing advance that causes a change in the timing advance.

9. The apparatus of claim 8 wherein the first and the second messages comprise messages transmitted on a Random Access Channel (RACH).

10. The apparatus of claim 8 further comprising location finding equipment coupled to the logic unit, the location finding equipment having a first distance from a first base station as an input, having a second distance from a second base station as an input, having a third distance from a third base station as an input, and calculating a location based on the first, the second, and the third distances.

* * * * *